(12) United States Patent
Deng

(10) Patent No.: US 12,726,037 B2
(45) Date of Patent: Sep. 1, 2026

(54) HYBRID-MODE CHARGING CIRCUIT, AND CHARGING METHOD

(71) Applicant: ZHUHAI ISMARTWARE TECHNOLOGY CO., LTD., Zhuhai (CN)

(72) Inventor: Qin Deng, Zhuhai (CN)

(73) Assignee: ZHUHAI ISMARTWARE TECHNOLOGY CO., LTD. (CN)

( * ) Notice: Subject to any disclaimer, the term of this patent is extended or adjusted under 35 U.S.C. 154(b) by 719 days.

(21) Appl. No.: 18/268,048

(22) PCT Filed: Jun. 23, 2022

(86) PCT No.: PCT/CN2022/100599
§ 371 (c)(1),
(2) Date: Jun. 16, 2023

(87) PCT Pub. No.: WO2023/274002
PCT Pub. Date: Jan. 5, 2023

(65) Prior Publication Data

US 2024/0055881 A1 Feb. 15, 2024

(30) Foreign Application Priority Data

Jun. 29, 2021 (CN) ......................... 202110727329.8

(51) Int. Cl.
*H02M 1/00* (2007.01)
*H02J 7/90* (2026.01)
*H02M 3/158* (2006.01)

(52) U.S. Cl.
CPC ............. *H02J 7/90* (2026.01); *H02M 1/0095* (2021.05); *H02M 3/158* (2013.01); *H02J 2207/20* (2020.01)

(58) Field of Classification Search
CPC ................................ H02M 1/0095; H02J 7/90
(Continued)

(56) References Cited

U.S. PATENT DOCUMENTS

2009/0033293 A1* 2/2009 Xing ...................... H02M 3/07 323/284
2019/0393702 A1 12/2019 Su et al.
(Continued)

FOREIGN PATENT DOCUMENTS

CN 110198057 A 9/2019
CN 112928800 A 6/2021
(Continued)

*Primary Examiner* — Ahmed H Omar
(74) *Attorney, Agent, or Firm* — John Maldjian, Esq.; Stevens & Lee PC

(57) ABSTRACT

A hybrid-mode charging circuit, and a charging method are provided. The hybrid-mode charging circuit includes a hybrid-mode charging control circuit, configured to determine whether an adapter supports continuous voltage regulation, where when the adapter does not support continuous voltage regulation, a transistor M5 and a transistor M6 are controlled to be turned off and a transistor M1, a transistor M2, a transistor M3, and a transistor M4 are controlled to work in a buck charging mode or a three-level buck mode; and when the adapter supports continuous voltage regulation, the adapter is controlled to output two times of battery voltage, the transistor M5 and the transistor M6 are controlled to be always in an on state, and the transistor M1, the transistor M2, the transistor M3, and the transistor M4 are controlled to be turned on or off alternately.

20 Claims, 2 Drawing Sheets

(58) Field of Classification Search
USPC .......................................................... 320/143
See application file for complete search history.

(56) References Cited

U.S. PATENT DOCUMENTS

| | | | | |
|---|---|---|---|---|
| 2020/0350817 | A1* | 11/2020 | De | H02M 3/155 |
| 2021/0067033 | A1* | 3/2021 | Jing | H02M 3/158 |
| 2022/0255433 | A1 | 8/2022 | Wen et al. | |

FOREIGN PATENT DOCUMENTS

| | | | |
|---|---|---|---|
| CN | 113507149 | A | 10/2021 |
| WO | 2020/169037 | A1 | 8/2020 |
| WO | 2023274002 | A1 | 1/2023 |

* cited by examiner

HYBRID-MODE CHARGING CIRCUIT, AND CHARGING METHOD

CROSS REFERENCE TO RELATED APPLICATIONS

This application is a national stage application of International Patent Application No. PCT/CN2022/100599, filed on Jun. 23, 2022, which claims priority to Chinese Patent Application No. 202110727329.8, filed with the China National Intellectual Property Administration on Jun. 29, 2021, and entitled "HYBRID-MODE CHARGING CIRCUIT, AND CHARGING METHOD", all of which are incorporated herein by reference in their entirety.

BACKGROUND

The disclosure relates to the field of power supply management, and in particular, to a hybrid-mode charging circuit, and a charging method.

Currently, with the popularity of fast charging, power of mid to high-end mobile phones is generally greater than 20 W. High-voltage buck charging is generally used for a conventional mobile phone fast charging technology. As shown in FIG. 1, a specific method is that an adapter outputs a fixed high voltage, and then the voltage of the adapter is reduced to a battery voltage by using a buck charging circuit to charge a battery. The fast charging technology has good compatibility with the adapter, which is not only compatible with a high-voltage fast charging adapter, but also compatible with a conventional 5V charger. However, after the charging power is greater than 20 W, the high-voltage buck fast charging technology has a problem of low efficiency when the input voltage is high and the battery voltage is relatively low. Consequently, a smartphone with a charging power of 30 W or more has a serious heating problem when using the technology.

Compared with the high-voltage buck fast charging technology, a charge pump fast charging technology is favored by mobile phone manufacturers due to high charging efficiency. A charge pump half-voltage fast charging circuit is shown in FIG. 2. However, a charge pump cannot perform continuous buck on an input voltage and can perform only integer voltage division on the input voltage, for example, ½ voltage division. As a result, the use of the charge pump fast charging technology is limited to some extent. However, in recent years, after a PD PPS protocol with a continuous voltage regulation function is officially released and popularized on a large scale, the market share of an adapter with a continuous voltage regulation function has continuously increased. The continuous voltage regulation function is also referred to as continuous step voltage regulation. For example, the current PPS protocol has a voltage regulation range of 10 mV per step and a voltage regulation range of 3.3V to 21V. The adapter with the continuous voltage regulation function communicates with a charging device through a fast charging protocol and outputs a power supply voltage that is two times a battery voltage of the charging device, and then the power supply voltage is divided by half through a charge pump circuit, to directly charge the battery, thereby achieving high-power and high efficient charging of the mobile phone. Since the charge pump fast charging technology has the advantages of high power and high efficiency after matching the adapter with the continuous voltage regulation function, it has gradually become the mainstream charging technology for fast charging mobile phones with a charging power of 20 W or more.

However, the charge pump fast charging technology also has disadvantages. The charge pump fast charging technology needs to be matched with a customized adapter with a continuous voltage regulation function, and the adapter outputs two times of battery voltage to implement charge pump half-voltage fast charging. Most of current fast charging chargers do not support continuous voltage regulation. Therefore, smartphones with charge pump half-pump fast charging are used. To be compatible with a common adapter, in addition to be equipped with a charge pump fast charging chip, the smartphone also needs to be equipped with another charging chip with a buck function, such that the smartphone can be compatible with both the customized continuous voltage regulation charger and a common fast charging charger. Therefore, compared with the original conventional buck fast charging circuit, the charge pump half-voltage fast charging circuit increases the costs of a charging part of the mobile phone, and also occupies a PCB (circuit board) space inside the mobile phone.

To resolve the existing technical problems, a new charging circuit is urgently needed, which is compatible with different fast charging adapters and implements fast charging in a most efficient charging manner.

SUMMARY

Embodiments of the present disclosure aim to provide a hybrid-mode charging circuit and a charging method, which are compatible with different fast charging adapters simultaneously and implement fast charging in a most efficient charging manner.

To achieve the above objective, the present disclosure provides the following solutions.

A hybrid-mode charging circuit is provided, including: an adapter, a hybrid-mode charging control circuit, a transistor M1, a transistor M2, a transistor M3, a transistor M4, a transistor M5, a transistor M6, a flying capacitor, a power inductor, and a battery, where a gate of the transistor M1, a gate of the transistor M2, a gate of the transistor M3, a gate of the transistor M4, a gate of the transistor M5, and a gate of the transistor M6 are all connected to the hybrid-mode charging control circuit, an output terminal of the adapter is connected to a drain of the transistor M1, a source and a substrate of the transistor M1 are respectively connected to a drain of the transistor M2 and one terminal of the flying capacitor, a source and a substrate of the transistor M2 are respectively connected to a drain of the transistor M3, one terminal of the power inductor, and a drain of the transistor M5, a source and a substrate of the transistor M3 are respectively connected to the other terminal of the flying capacitor and a drain of the transistor M4, a source and a substrate of the transistor M4 are grounded, the other terminal of the power inductor is respectively connected to a drain of the transistor M6 and the battery, and a source and a substrate of the transistor M5 are connected to a source and a substrate of the transistor M6; and the hybrid-mode charging control circuit is configured to determine whether the adapter supports continuous voltage regulation for controlling on or off of the transistor M1, the transistor M2, the transistor M3, the transistor M4, the transistor M5, and the transistor M6; when the adapter does not support continuous voltage regulation, the transistor M5 and the transistor M6 are controlled to be turned off and the transistor M1, the transistor M2, the transistor M3, and the transistor M4 are controlled to work in a buck charging mode or a three-level buck mode; and when the adapter supports continuous voltage regulation, the adapter is controlled to output two times of battery voltage, the transistor M5 and the transistor M6 are controlled to be always in an on state, and the transistor M1, the transistor M2, the transistor M3, and the transistor M4 are controlled to be turned on or off alternately, such that the charging circuit works in a charge pump buck working mode.

In one embodiment, the hybrid-mode charging circuit further includes: an input power supply fast charging protocol communication module, where the input power supply fast charging protocol communication module is connected to the adapter through a fast charging communication interface.

In another embodiment, the hybrid-mode charging circuit further includes: a battery capacitor, where the battery capacitor is respectively connected to the battery, the power inductor, and the drain of the transistor M6.

In a further embodiment, the hybrid-mode charging circuit further includes: a transistor M7, a system power supply end, and a power supply capacitor, where a gate of the transistor M7 is connected to the hybrid-mode charging control circuit, a drain of the transistor M7 is respectively connected to the system power supply end, the power inductor, and one terminal of the power supply capacitor, the other terminal of the power supply capacitor is grounded, and a source and a substrate of the transistor M7 are respectively connected to the drain of the transistor M6 and the battery.

A charging method for a hybrid-mode charging circuit is provided, for implementing the hybrid-mode charging circuit, where the charging method includes: determining whether an adapter supports continuous voltage regulation; controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode; and controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode.

Further, the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode specifically includes: controlling the transistor M5 and the transistor M6 to be turned off, such that a power inductor is connected to the charging circuit, controlling the transistor M1 and the transistor M4 to be always in an on state, such that a flying capacitor is connected to a circuit between the adapter and a ground, and forming a buck converter by using the transistor M2 as an upper power transistor of the buck converter and using the transistor M3 as a lower power transistor of the buck converter, by controlling alternate on of the transistor M2 and the transistor M3 and a duty ratio, and in combination with the power inductor; or controlling the transistor M5 and the transistor M6 to be turned off, such that a power inductor is connected to the charging circuit, controlling the transistor M2 and the transistor M3 to be always in an on state, such that a flying capacitor is short-circuited, and forming a buck converter by using the transistor M1 as an upper power transistor of the buck converter and using the transistor M4 as a lower power transistor of the buck converter, by controlling alternate on of the transistor M1 and the transistor M4 and a duty ratio, and in combination with the power inductor; or controlling the transistor M5 and the transistor M6 to be turned off, such that a power inductor is connected to the charging circuit, and controlling the transistor M1, the transistor M2, the transistor M3, and the transistor M4 to be turned on alternately, such that the charging circuit is in the three-level buck mode in combination with a CFLY and the power inductor.

Further, after the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode, the charging method further includes: converting a voltage of the adapter to a system power supply end, where a transistor M7 is always in an on state, and a hybrid-mode charging control circuit controls a duty ratio of a buck converter, to allow a voltage of the system power supply end to be greater than the battery voltage.

The controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode specifically includes: controlling the adapter to output the two times of battery voltage; controlling the transistor M5 and the transistor M6 to be always in the on state, such that a power inductor is short-circuited; and controlling the transistor M1, the transistor M2, the transistor M3, and the transistor M4 to be turned on or off alternately, where an output voltage of a flying capacitor is equal to the battery voltage, such that the charging circuit is in a charge pump control mode.

Another embodiment provides the following technical effects.

According to the hybrid-mode charging circuit and the charging method provided in the present disclosure, when the adapter does not support continuous voltage regulation, the transistor M5 and the transistor M6 are controlled to be turned off and the transistor M1, the transistor M2, the transistor M3, and the transistor M4 are controlled to work in the buck charging mode or the three-level buck mode; and when the adapter supports continuous voltage regulation, the adapter is controlled to output the two times of battery voltage, the transistor M5 and the transistor M6 are controlled to be always in the on state, and the transistor M1, the transistor M2, the transistor M3, and the transistor M4 are controlled to be turned on or off alternately, such that the charging circuit works in the charge pump buck mode. The hybrid-mode charging circuit has both a high-voltage buck fast charging function and a charge pump fast charging function, and has the advantage of high efficiency of charge pump fast charging, and also has good compatibility of a buck charging circuit with the adapter. In addition, one chip has functions of two chips, thereby reducing the costs of charging a mobile phone and reducing the occupation of PCB space of the mobile phone.

BRIEF DESCRIPTION OF THE DRAWINGS

The above and still further features and advantages of embodiments of the present disclosure will become apparent upon consideration of the following detailed description of embodiments thereof, especially when taken in conjunction with the accompanying drawings, and wherein.

DETAILED DESCRIPTION OF THE EMBODIMENTS

The embodiments are merely a part rather than all of the embodiments of the present disclosure. All other embodiments obtained by those of ordinary skill in the art based on the embodiments of the present disclosure without creative efforts shall fall within the protection scope of the present disclosure.

In the present disclosure, a hybrid-mode charging circuit and a charging method, which are compatible with different fast charging adapters simultaneously and implement fast charging in a most efficient charging manner.

To make the above objectives, features, and advantages of the present disclosure clearer and more comprehensible, the present disclosure will be further described in detail below with reference to the accompanying drawings and the specific implementations.

Figure 1:
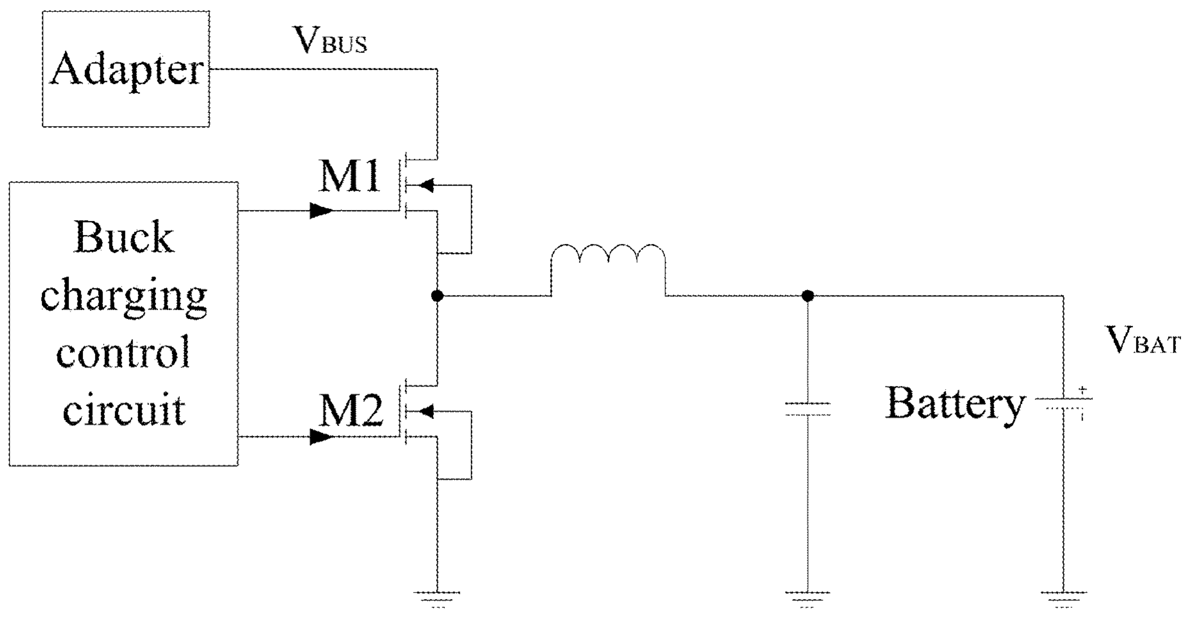
FIG. 1 is a schematic structural diagram of a conventional buck charging circuit.
Figure 2:
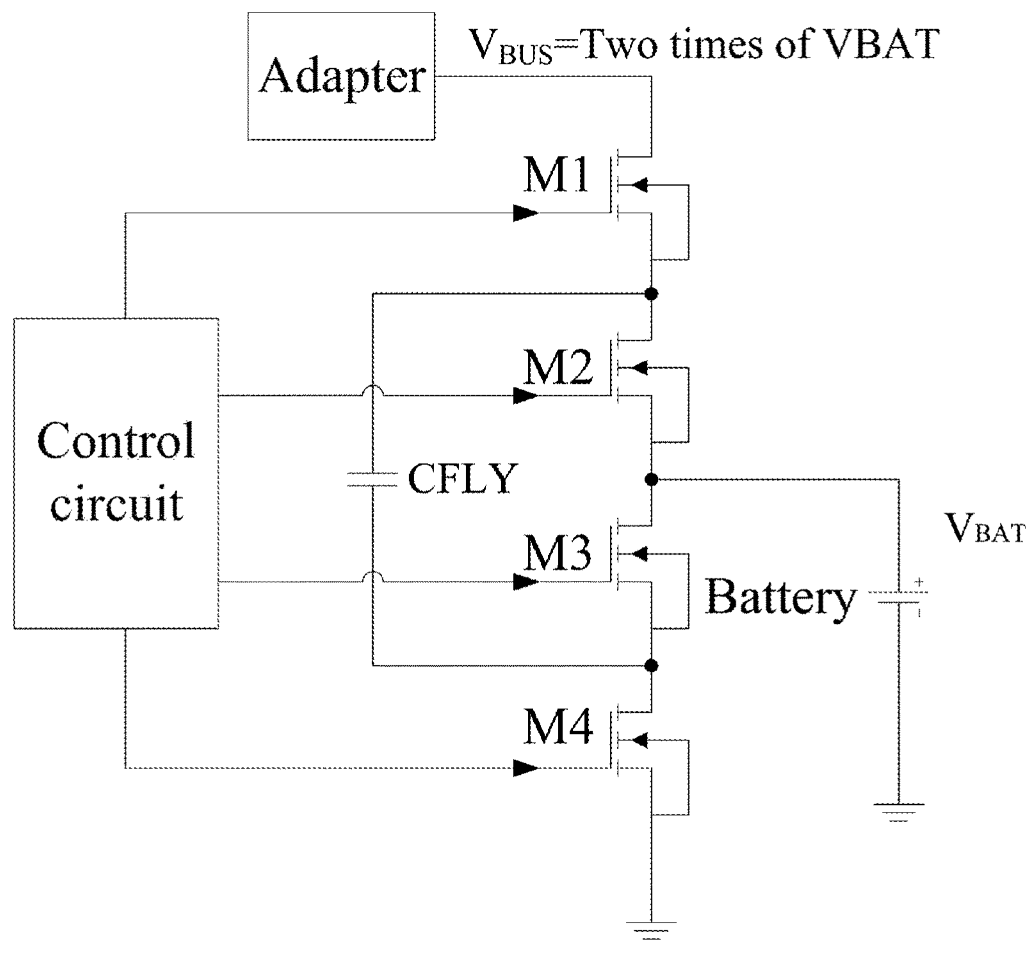
FIG. 2 is a schematic structural diagram of an existing charge pump half-voltage fast charging circuit.
Figure 3:
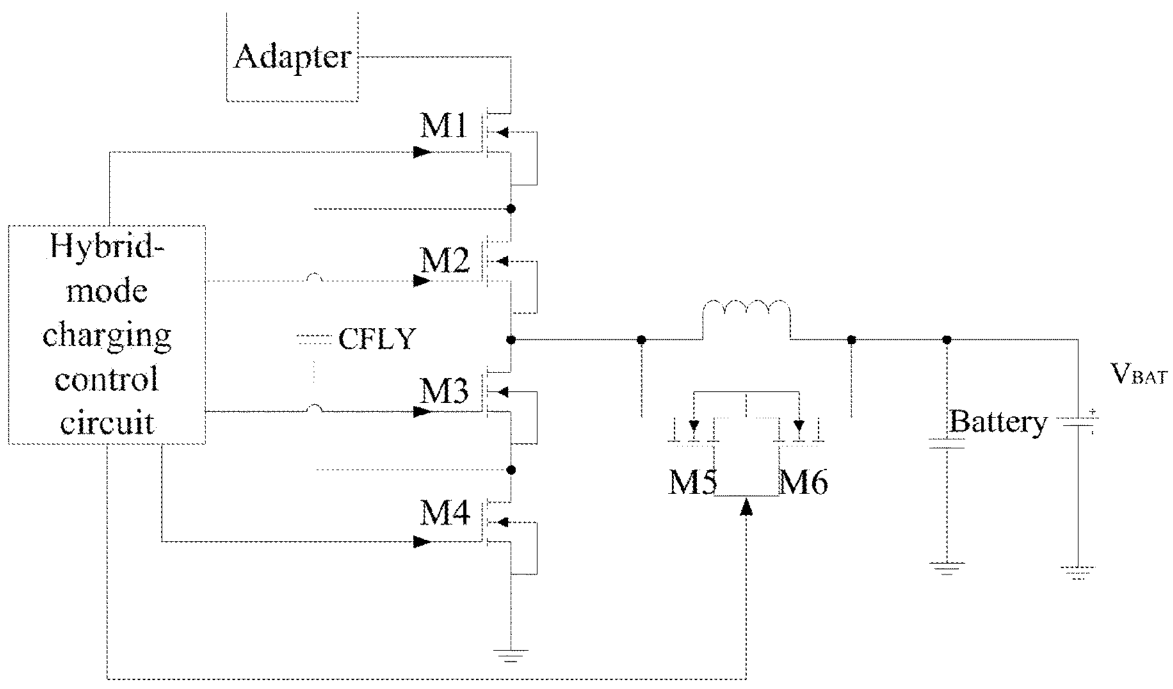
FIG. 3 is a schematic structural diagram of a hybrid-mode charging circuit according to the present disclosure.

FIG. 3 is a schematic structural diagram of a hybrid-mode charging circuit according to the present disclosure. As shown in FIG. 3, the hybrid-mode charging circuit includes: an adapter, a hybrid-mode charging control circuit, a transistor M1, a transistor M2, a transistor M3, a transistor M4, a transistor M5, a transistor M6, a flying capacitor, a power inductor, and a battery.

A gate of the transistor M1, a gate of the transistor M2, a gate of the transistor M3, a gate of the transistor M4, a gate of the transistor M5, and a gate of the transistor M6 are all connected to the hybrid-mode charging control circuit, an output terminal of the adapter is connected to a drain of the transistor M1, a source and a substrate of the transistor M1 are respectively connected to a drain of the transistor M2 and one terminal of the flying capacitor, a source and a substrate of the transistor M2 are respectively connected to a drain of the transistor M3, one terminal of the power inductor, and a drain of the transistor M5, a source and a substrate of the transistor M3 are respectively connected to the other terminal of the flying capacitor and a drain of the transistor M4, a source and a substrate of the transistor M4 are grounded, the other terminal of the power inductor is respectively connected to a drain of the transistor M6 and the battery, and a source and a substrate of the transistor M5 are connected to a source and a substrate of the transistor M6.

The hybrid-mode charging control circuit is configured to determine whether the adapter supports continuous voltage regulation for controlling on or off of the transistor M1, the transistor M2, the transistor M3, the transistor M4, the transistor M5, and the transistor M6; when the adapter does not support continuous voltage regulation, the transistor M5 and the transistor M6 are controlled to be turned off and the transistor M1, the transistor M2, the transistor M3, and the transistor M4 are controlled to work in a buck charging mode or a three-level buck mode; and when the adapter supports continuous voltage regulation, the adapter is controlled to output two times of battery voltage, the transistor M5 and the transistor M6 are controlled to be always in an on state, and the transistor M1, the transistor M2, the transistor M3, and the transistor M4 are controlled to be turned on or off alternately, such that the charging circuit works in a charge pump buck mode.

That is, when an input adapter has no continuous voltage regulation function, and can output only a fixed high voltage or 5V, the bypass transistors M5 and M6 that are connected to the power inductor in parallel are turned off, such that the power inductor is connected to the circuit. In addition, the hybrid-mode charging control circuit works in a buck converter working mode, and the power inductor and a power switch form a conventional buck DCDC (a buck converter) by controlling four power transistors M1 to M4, such that the hybrid-mode charging circuit works in a buck DCDC mode (a buck converter working mode), and converts an input voltage into a battery voltage to charge the battery. When the input adapter has the continuous voltage regulation function, the bypass transistors M5 and M6 that are connected to the power inductor in parallel are turned on, and the power inductor is bypassed. In addition, the hybrid-mode charging control circuit works in a charge pump working mode, controls four power transistors in a charge pump working manner, and cooperates with a CFLY, such that the circuit works in a charge pump mode, thereby implementing charge pump fast charging.

As shown in FIG. 3, when the input adapter supports continuous voltage regulation (for example, PPS, SCP, QC4+, and QC5), the hybrid-mode fast charging circuit works in the charge pump mode. The bypass transistors M5 and M6 are turned on, and the power inductor is short-circuited. In this case, the input adapter outputs a voltage $V_{BUS}=2\times V_{BAT}$ two times the battery voltage. The hybrid-mode charging control circuit works in the charge pump control mode and controls the transistor M1 to the transistor M4 to be turned on alternately in a control manner shown in Table 1. A conventional half-voltage buck charge pump is formed by using CFLY as a flying capacitor of the charge pump, and an output voltage is equal to the battery voltage $V_{BAT}$, to implement half-voltage fast charging of the battery. At Phase1, which is a CFLY charging cycle, the transistor M1 and the transistor M3 are turned on, the transistor M2 and the transistor M4 are turned off, a capacitor lower plate is connected to the battery, a capacitor upper plate is connected to the adapter, and the adapter charges the CFLY, where $V_{CFLY}=V_{BUS}-V_{BAT}=V_{BAT}$. At Phase2, which is a cycle over which the flying capacitor charges the battery, the flying capacitor CFLY discharges. The transistor M1 and the transistor M3 is turned off, and the transistor M2 and the transistor M4 is turned on. A CFLY upper plate is connected to the battery, and a CFLY lower plate is grounded, to charge the battery by using the CFLY, where $V_{CFLY}=V_{BAT}$.

TABLE 1

| Phase | M1 | M2 | M3 | M4 | M5&M6 | CFLY | Inductor |
|---|---|---|---|---|---|---|---|
| Phase1 | ON | OFF | ON | OFF | Normally-ON | $V_{CFLY} = V_{BUS} - V_{BAT}$ Charge a capacitor by using $V_{BUS}$ | Bypassed by M5&M6 |

TABLE 1-continued

| Phase | M1 | M2 | M3 | M4 | M5&M6 | CFLY | Inductor |
|---|---|---|---|---|---|---|---|
| Phase2 | OFF | ON | OFF | ON | Normally-ON | $V_{CFLY} = V_{BAT}$ Charge a battery by using the capacitor | Bypassed by M5&M6 |

When an input charger is a fixed 5V or is a high-voltage fast charging adapter without continuous voltage regulation, a conventional buck circuit can be implemented in a control manner of Table 2. In this case, the bypass transistors M5 and M6 are turned off, and the power inductor is connected to the charging circuit as a power inductor of the buck converter. The transistor M1 and the transistor M4 is normally turned on, the CFLY is connected between the adapter and a ground as a filter capacitor of the input power supply adapter. The transistor M2 is used as an upper power transistor of the buck converter, and the transistor M3 is used as a lower power transistor of the buck converter. The hybrid-mode charging control circuit works in a conventional buck converter control mode, and a conventional buck converter is formed by controlling the alternate on of the upper transistor M2 and the lower transistor M3 and a duty cycle in combination with the power inductor, to achieve a buck function, thereby implementing buck charging of the battery.

TABLE 2

| Control manner | M1 | M2 | M3 | M4 | M5&M6 | CFLY | Inductor |
|---|---|---|---|---|---|---|---|
| Manner 1 | Normally-ON | Upper transistor of a buck conversion circuit | Lower transistor of the buck conversion circuit | Normally-ON | OFF | Connected between $V_{BUS}$ and GND through M1 and M4 as a filter capacitor of $V_{BUS}$ | As a power inductor of the buck conversion circuit |

In addition, the conventional buck converter function can also be implemented in a control manner shown in Table 3. The bypass transistors M5 and M6 are turned off, and the power inductor is connected to the charging circuit as a power inductor. The transistor M2 and the transistor M3 are normally turned on, and the CFLY is short-circuited and is useless. The transistor M1 is used as an upper power transistor of the buck converter, and the transistor M4 is used as a lower power transistor of the buck converter. The hybrid-mode charging control circuit works in the buck converter working mode, and a conventional buck converter is formed by controlling the alternate on of the upper transistor M1 and the lower transistor M4 and a duty cycle in combination with the power inductor, to implement a buck function, thereby implement buck charging of the battery.

TABLE 3

| Control manner | M1 | M2 | M3 | M4 | M5&M6 | CFLY | Inductor |
|---|---|---|---|---|---|---|---|
| Manner 2 | Upper transistor of the buck conversion circuit | Normally-ON | Normally-ON | Lower transistor of the buck conversion circuit | OFF | Bypassed by M2 and M3 | As the power inductor of the buck conversion circuit |

Further, when the input adapter does not support continuous voltage regulation, and when the hybrid-mode fast charging circuit works in the buck converter mode, the hybrid-mode fast charging circuit can also work in a three-level buck working mode in addition to working in the conventional buck converter mode in the control manners shown in Table 2 and Table 3. In this case, the bypass transistors M5 and M6 are in an off state, and the power inductor is connected to the charging circuit as a power inductor. The hybrid-mode charging control circuit is in the three-level buck working mode and controls the transistor M1, the transistor M2, the transistor M3, and the transistor M4 to be turned on alternately, to implement a buck charging function in combination with the CFLY and the power inductor. The three-level buck working mode is a hybrid-mode converter, and the three-level buck converter combines the functions of the power inductor and the CFLY, to maintain a voltage drop on two terminals of the CFLY at a half of the input voltage $V_{BUS}$, so as to reduce an electric stress of a power MOS. Therefore, the hybrid-mode charging control circuit works in the three-level buck mode, to reduce a ripple current, such that a smaller inductor can be used. When the duty ratio D is less than 0.5, the hybrid-mode charging control works in a control manner shown in Table 4, and SW is flipped between $\frac{1}{2}V_{BUS}$ and the GND. When the duty ratio D is greater than 0.5, the hybrid-mode charging control circuit works in a control manner shown in Table 5, and SW is flipped between $V_{BUS}$ and $\frac{1}{2}V_{BUS}$.

TABLE 4

| Duty ratio < 0.5 | M1 | M2 | M3 | M4 | CFLY | M5&M6 | Inductor |
|---|---|---|---|---|---|---|---|
| Phase1 | ON | OFF | ON | OFF | Flying capacitor performs charging $V_{CFLY} = ½ \times V_{BUS}$ | OFF | As the power inductor of the buck conversion circuit |
| Phase2 | OFF | OFF | ON | ON | The flying capacitor maintains $V_{CFLY} = ½ \times V_{BUS}$ | | |
| Phase3 | OFF | ON | OFF | ON | The flying capacitor discharges $V_{CFLY} = ½ \times V_{BUS}$ | | |

TABLE 5

| Duty ratio > 0.5 | M1 | M2 | M3 | M4 | CFLY | M5&M6 | Inductor |
|---|---|---|---|---|---|---|---|
| Phase1 | ON | OFF | ON | OFF | Flying capacitor performs charging $V_{CFLY} = ½ \times V_{BUS}$ | OFF | As the power inductor of the buck conversion circuit |
| Phase2 | ON | ON | OFF | OFF | The flying capacitor maintains $V_{CFLY} = ½ \times V_{BUS}$ | | |
| Phase3 | OFF | ON | OFF | ON | The flying capacitor discharges $V_{CFLY} = ½ \times V_{BUS}$ | | |

The hybrid fast charging circuit and an input power supply fast charging protocol communication module are integrated into a same chip. The hybrid-mode charging circuit provided in the present disclosure further includes: an input power supply fast charging protocol communication module, where the input power supply fast charging protocol communication module is connected to the adapter through a fast charging communication interface.

That is, the adapter is provided with a source fast charging protocol chip, and a sink fast charging protocol chip integrated in a mobile phone or a charging device communicates with the hybrid-mode charging circuit. That is, the sink fast charging protocol chip communicates with the source fast charging protocol chip in a fast charging manner, to identify a type of an adapter. In addition, the sink fast charging protocol chip notifies the hybrid-mode charging circuit of an identification result.

The hybrid-mode charging circuit provided in the present invention further includes: a battery capacitor.

The battery capacitor is respectively connected to the battery, the power inductor, and the drain of the transistor M6.

To enable the charging circuit to have an NVDC charging control function, that is, not only have a battery charging function, but also have a function of supplying power to a system, a function of charging while discharging can be achieved. The hybrid-mode charging circuit provided in the present disclosure further includes: a transistor M7, a system power supply end, and a power supply capacitor.

Figure 4:
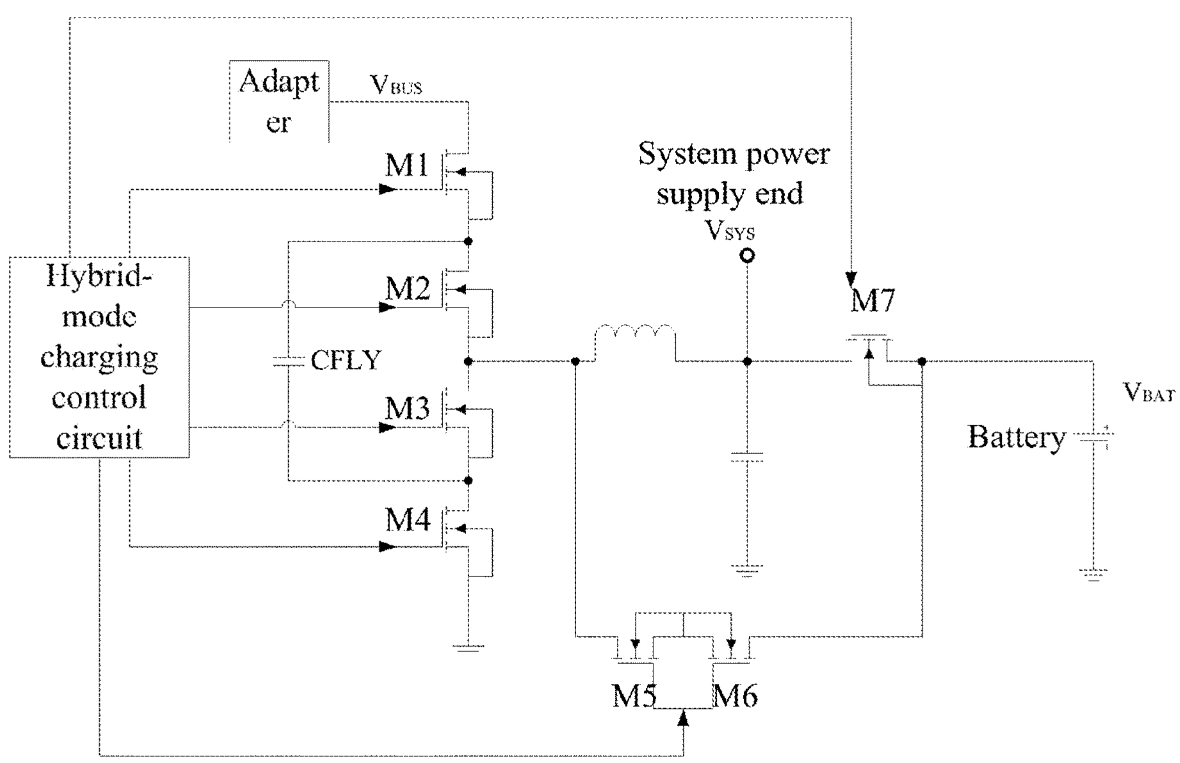
FIG. 4 is a schematic structural diagram of a hybrid-mode charging circuit with an NVDC function according to an embodiment of the present disclosure.

FIG. 4 is a schematic structural diagram of a hybrid-mode charging circuit with an NVDC function according to an embodiment of the present disclosure. As shown in FIG. 4, a gate of the transistor M7 is connected to the hybrid-mode charging control circuit, a drain of the transistor M7 is respectively connected to the system power supply end, the power inductor, and one terminal of the power supply capacitor, the other terminal of the power supply capacitor is grounded, and a source and a substrate of the transistor M7 are respectively connected to the drain of the transistor M6 and the battery.

The "charging while discharging" means that the system can be powered while the battery is charged. The charging circuit with the NVDC charging while discharging function is a basic requirement of power supply systems of devices such as a smartphone, a laptop, and a tablet. This embodiment not only achieves the function of charging while discharging, but also achieves high-efficient charging, and can also be compatible with different fast charging adapters and implement fast charging in a most efficient charging manner. Therefore, this embodiment has high use value.

When the input adapter does not have the continuous voltage regulation function, the hybrid-mode charging control circuit works in the buck converter working mode in the control manner shown in Table 2 and converts the voltage of the adapter into $V_{SYS}$, to supply power to the system. In this case, the transistor M7 is in a normally-on state or an LDO state to charge the battery. When the transistor M7 is in the normally-on state, the charging control circuit controls the voltage $V_{SYS}$ to be slightly greater than a BAT voltage by controlling the duty ratio of the buck converter, and $V_{SYS}$ is equal to the BAT voltage plus a voltage drop of a charging current over the transistor M7, thereby achieving the function of charging while discharging. It is assumed that an on resistor of the transistor M7 is Ron7, $V_{SYS}=V_{BAT}+I_{BAT}\times$ Ron7, where $I_{BAT}$ is a BAT current. When a power supply capacity of the adapter is less than the power consumption of the system, since the transistor M7 is turned on, the adapter can simultaneously supply power to the system through the buck converter and the battery, so as to meet the power supply requirement of the system.

When the input adapter has the continuous voltage regulation function, the adapter outputs two times of battery voltage. In addition, the transistor M5 and the transistor M6 are turned on, the power inductor is bypassed, and the hybrid-mode charging control circuit works in a charge pump half-voltage direct charging mode in the control manner shown in Table 1, to achieve a high-efficient charge pump direct charging function of the battery. In addition, the transistor M7 is turned on, such that the battery can directly supply power to a system end, to achieve the function of charging while discharging.

A charging method for a hybrid-mode charging circuit provided in the present disclosure is used for implementing the hybrid-mode charging circuit, where the charging method includes: determining whether an adapter supports continuous voltage regulation; controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode; and controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately.

The controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode specifically includes: controlling the transistor M5 and the transistor M6 to be turned off, such that a power inductor is connected to the charging circuit, controlling the transistor M1 and the transistor M4 to be always in an on state, such that a flying capacitor is connected to a circuit between the adapter and a ground, and forming a buck converter by using the transistor M2 as an upper power transistor of the buck converter and using the transistor M3 as a lower power transistor of the buck converter, by controlling alternate on of the transistor M2 and the transistor M3 and a duty ratio, and in combination with the power inductor; or controlling the transistor M5 and the transistor M6 to be turned off, such that a power inductor is connected to the charging circuit, controlling the transistor M2 and the transistor M3 to be always in an on state, such that a flying capacitor is short-circuited, and forming a buck converter by using the transistor M1 as an upper power transistor of the buck converter and using the transistor M4 as a lower power transistor of the buck converter, by controlling alternate on of the transistor M1 and the transistor M4 and a duty ratio, and in combination with the power inductor; or controlling the transistor M5 and the transistor M6 to be turned off, such that a power inductor is connected to the charging circuit, and controlling the transistor M1, the transistor M2, the transistor M3, and the transistor M4 to be turned on alternately, such that the charging circuit is in the three-level buck mode in combination with a CFLY and the power inductor.

After the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode, the charging method further includes: converting a voltage of the adapter to a system power supply end, where a transistor M7 is always in an on state, and a hybrid-mode charging control circuit controls a duty ratio of a buck converter, to allow a voltage of the system power supply end to be greater than the battery voltage.

The controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode specifically includes: controlling the adapter to output the two times of battery voltage; controlling the transistor M5 and the transistor M6 to be always in the on state, such that a power inductor is short-circuited; and controlling the transistor M1, the transistor M2, the transistor M3, and the transistor M4 to be turned on or off alternately, where an output voltage of a flying capacitor is equal to the battery voltage, such that the charging circuit is in a charge pump control mode.

Charge pumps have various structures and cannot be enumerated one by one. A half buck charge pump circuit is used in this embodiment. The hybrid control mode provided in the present disclosure can be applied to implement a hybrid charging circuit formed by a buck converter and various buck charge pumps, for example, a one-third buck charge pump, a quarter buck charge pump, and a two-sixths buck charge pump mode.

Each example of the present specification is described in a progressive manner, each example focuses on the difference from other examples, and the same and similar parts between the examples may refer to each other. Since the system disclosed in an example corresponds to the method disclosed in another example, the description is relatively simple, and reference can be made to the method description.

Specific examples are used herein to explain the principles and implementations of the present disclosure. The foregoing description of the examples is merely intended to help understand the method of the present disclosure and its core ideas; besides, various modifications may be made by those of ordinary skill in the art to specific implementations and the scope of application in accordance with the ideas of the present disclosure. In conclusion, the content of the present specification shall not be construed as limitations to the present disclosure.

What is claimed is:

1. A hybrid-mode charging circuit, comprising: an adapter, a hybrid-mode charging control circuit, a transistor M1, a transistor M2, a transistor M3, a transistor M4, a transistor M5, a transistor M6, a flying capacitor, a power inductor, and a battery, wherein a gate of the transistor M1, a gate of the transistor M2, a gate of the transistor M3, a gate of the transistor M4, a gate of the transistor M5, and a gate of the transistor M6 are all connected to the hybrid-mode charging control circuit, an output terminal of the adapter is connected to a drain of the transistor M1, a source and a substrate of the transistor M1 are respectively connected to a drain of the transistor M2 and one terminal of the flying capacitor, a source and a substrate of the transistor M2 are respectively connected to a drain of the transistor M3, one terminal of the power inductor, and a drain of the transistor M5, a source and a substrate of the transistor M3 are respectively connected to the other terminal of the flying capacitor and a drain of the transistor M4, a source and a substrate of the transistor M4 are grounded, the other terminal of the power inductor is respectively connected to a drain of the transistor M6 and the battery, and a source and a substrate of the transistor M5 are connected to a source and a substrate of the transistor M6; and the hybrid-mode charging control circuit is configured to determine whether the adapter supports continuous voltage regulation for controlling on or off of the transistor M1, the transistor M2, the transistor M3, the transistor M4, the transistor M5, and the transistor M6; when the adapter does not support continuous voltage regulation, the transistor M5 and the transistor M6 are controlled to be turned off and the transistor M1, the transistor M2, the transistor M3, and the transistor M4 are controlled to work in a buck charging mode or a three-level buck mode; and when the adapter supports continuous voltage regulation, the adapter is controlled to output two times of battery voltage, the transistor M5 and the transistor M6 are controlled to be always in an on state, and the transistor M1, the transistor M2, the transistor M3, and the transistor M4 are controlled to be turned on or off alternately, such that the charging circuit works in a charge pump buck mode.

2. The hybrid-mode charging circuit according to claim 1, further comprising: an input power supply fast charging protocol communication module, wherein the input power supply fast charging protocol communication module is connected to the adapter through a fast charging communication interface.

3. The hybrid-mode charging circuit according to claim 1, further comprising: a battery capacitor, wherein the battery capacitor is respectively connected to the battery, the power inductor, and the drain of the transistor M6.

4. The hybrid-mode charging circuit according to claim 1, further comprising: a transistor M7, a system power supply end, and a power supply capacitor, wherein a gate of the transistor M7 is connected to the hybrid-mode charging control circuit, a drain of the transistor M7 is respectively connected to the system power supply end, the power inductor, and one terminal of the power supply capacitor, the other terminal of the power supply capacitor is grounded, and a source and a substrate of the transistor M7 are respectively connected to the drain of the transistor M6 and the battery.

5. A charging method for a hybrid-mode charging circuit, for implementing the hybrid-mode charging circuit according to claim 1, wherein the charging method comprises:

determining whether an adapter supports continuous voltage regulation;

controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode; and controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode.

6. The charging method for a hybrid-mode charging circuit according to claim 5, further comprising: an input power supply fast charging protocol communication module, wherein the input power supply fast charging protocol communication module is connected to the adapter through a fast charging communication interface.

7. The charging method for a hybrid-mode charging circuit according to claim 5, further comprising: a battery capacitor, wherein the battery capacitor is respectively connected to the battery, the power inductor, and the drain of the transistor M6.

8. The charging method for a hybrid-mode charging circuit according to claim 5, further comprising: a transistor M7, a system power supply end, and a power supply capacitor, wherein a gate of the transistor M7 is connected to the hybrid-mode charging control circuit, a drain of the transistor M7 is respectively connected to the system power supply end, the power inductor, and one terminal of the power supply capacitor, the other terminal of the power supply capacitor is grounded, and a source and a substrate of the transistor M7 are respectively connected to the drain of the transistor M6 and the battery.

9. The charging method for a hybrid-mode charging circuit according to claim 5, wherein the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode specifically comprises:

controlling the transistor M5 and the transistor M6 to be turned off, such that a power inductor is connected to the charging circuit, controlling the transistor M1 and the transistor M4 to be always in an on state, such that a flying capacitor is connected to a circuit between the adapter and a ground, and forming a buck converter by using the transistor M2 as an upper power transistor of the buck converter and using the transistor M3 as a lower power transistor of the buck converter, by controlling alternate on of the transistor M2 and the transistor M3 and a duty ratio, and in combination with the power inductor; or controlling the transistor M5 and the transistor M6 to be turned off, such that a power inductor is connected to the charging circuit, controlling the transistor M2 and the transistor M3 to be always in an on state, such that a flying capacitor is short-circuited, and forming a buck converter by using the transistor M1 as an upper power transistor of the buck converter and using the transistor M4 as a lower power transistor of the buck converter, by controlling alternate on of the transistor M1 and the transistor M4 and a duty ratio, and in combination with the power inductor; or controlling the transistor M5 and the transistor M6 to be turned off, such that a power inductor is connected to the charging circuit, and controlling the transistor M1, the transistor M2, the transistor M3, and the transistor M4 to be turned on alternately, such that the charging circuit is in the three-level buck mode in combination with a CFLY and the power inductor.

10. The charging method for a hybrid-mode charging circuit according to claim 6, wherein the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode specifically comprises:

controlling the transistor M5 and the transistor M6 to be turned off, such that a power inductor is connected to the charging circuit, controlling the transistor M1 and the transistor M4 to be always in an on state, such that a flying capacitor is connected to a circuit between the adapter and a ground, and forming a buck converter by using the transistor M2 as an upper power transistor of the buck converter and using the transistor M3 as a lower power transistor of the buck converter, by controlling alternate on of the transistor M2 and the transistor M3 and a duty ratio, and in combination with the power inductor; or controlling the transistor M5 and the transistor M6 to be turned off, such that a power inductor is connected to the charging circuit, controlling the transistor M2 and the transistor M3 to be always in an on state, such that a flying capacitor is short-circuited, and forming a buck converter by using the transistor M1 as an upper power transistor of the buck converter and using the transistor M4 as a lower power transistor of the buck converter, by controlling alternate on of the transistor M1 and the transistor M4 and a duty ratio, and in combination with the power inductor; or controlling the transistor M5 and the transistor M6 to be turned off, such that a power inductor is connected to the charging circuit, and controlling the transistor M1, the transistor M2, the transistor M3, and the transistor M4 to be turned on alternately, such that the charging circuit is in the three-level buck mode in combination with a CFLY and the power inductor.

11. The charging method for a hybrid-mode charging circuit according to claim 7, wherein the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode specifically comprises:

controlling the transistor M5 and the transistor M6 to be turned off, such that a power inductor is connected to the charging circuit, controlling the transistor M1 and the transistor M4 to be always in an on state, such that a flying capacitor is connected to a circuit between the adapter and a ground, and forming a buck converter by using the transistor M2 as an upper power transistor of the buck converter and using the transistor M3 as a lower power transistor of the buck converter, by controlling alternate on of the transistor M2 and the transistor M3 and a duty ratio, and in combination with the power inductor; or controlling the transistor M5 and the transistor M6 to be turned off, such that a power inductor is connected to the charging circuit, controlling the transistor M2 and the transistor M3 to be always in an on state, such that a flying capacitor is short-circuited, and forming a buck converter by using the transistor M1 as an upper power transistor of the buck converter and using the transistor M4 as a lower power transistor of the buck converter, by controlling alternate on of the transistor M1 and the transistor M4 and a duty ratio, and in combination with the power inductor; or controlling the transistor M5 and the transistor M6 to be turned off, such that a power inductor is connected to the charging circuit, and controlling the transistor M1, the transistor M2, the transistor M3, and the transistor M4 to be turned on alternately, such that the charging circuit is in the three-level buck mode in combination with a CFLY and the power inductor.

12. The charging method for a hybrid-mode charging circuit according to claim 8, wherein the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode specifically comprises:

controlling the transistor M5 and the transistor M6 to be turned off, such that a power inductor is connected to the charging circuit, controlling the transistor M1 and the transistor M4 to be always in an on state, such that a flying capacitor is connected to a circuit between the adapter and a ground, and forming a buck converter by using the transistor M2 as an upper power transistor of the buck converter and using the transistor M3 as a lower power transistor of the buck converter, by controlling alternate on of the transistor M2 and the transistor M3 and a duty ratio, and in combination with the power inductor; or controlling the transistor M5 and the transistor M6 to be turned off, such that a power inductor is connected to the charging circuit, controlling the transistor M2 and the transistor M3 to be always in an on state, such that a flying capacitor is short-circuited, and forming a buck converter by using the transistor M1 as an upper power transistor of the buck converter and using the transistor M4 as a lower power transistor of the buck converter, by controlling alternate on of the transistor M1 and the transistor M4 and a duty ratio, and in combination with the power inductor; or controlling the transistor M5 and the transistor M6 to be turned off, such that a power inductor is connected to the charging circuit, and controlling the transistor M1, the transistor M2, the transistor M3, and the transistor M4 to be turned on alternately, such that the charging circuit is in the three-level buck mode in combination with a CFLY and the power inductor.

13. The charging method for a hybrid-mode charging circuit according to claim 5, wherein after the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode, the charging method further comprises:

converting a voltage of the adapter to a system power supply end, wherein a transistor M7 is always in an on state, and a hybrid-mode charging control circuit controls a duty ratio of a buck converter, to allow a voltage of the system power supply end to be greater than the battery voltage.

14. The charging method for a hybrid-mode charging circuit according to claim 6, wherein after the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode, the charging method further comprises:

converting a voltage of the adapter to a system power supply end, wherein a transistor M7 is always in an on state, and a hybrid-mode charging control circuit controls a duty ratio of a buck converter, to allow a voltage of the system power supply end to be greater than the battery voltage.

15. The charging method for a hybrid-mode charging circuit according to claim 7, wherein after the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode, the charging method further comprises:

converting a voltage of the adapter to a system power supply end, wherein a transistor M7 is always in an on state, and a hybrid-mode charging control circuit controls a duty ratio of a buck converter, to allow a voltage of the system power supply end to be greater than the battery voltage.

16. The charging method for a hybrid-mode charging circuit according to claim 8, wherein after the controlling, if the adapter does not support continuous voltage regulation, a transistor M5 and a transistor M6 to be turned off and controlling a transistor M1, a transistor M2, a transistor M3, and a transistor M4 to work in a buck charging mode or a three-level buck mode, the charging method further comprises:

converting a voltage of the adapter to a system power supply end, wherein a transistor M7 is always in an on state, and a hybrid-mode charging control circuit controls a duty ratio of a buck converter, to allow a voltage of the system power supply end to be greater than the battery voltage.

17. The charging method for a hybrid-mode charging circuit according to claim 5, wherein the controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode specifically comprises:

controlling the adapter to output the two times of battery voltage;

controlling the transistor M5 and the transistor M6 to be always in the on state, such that a power inductor is short-circuited; and controlling the transistor M1, the transistor M2, the transistor M3, and the transistor M4 to be turned on or off alternately, wherein an output voltage of a flying capacitor is equal to the battery voltage, such that the charging circuit is in a charge pump control mode.

18. The charging method for a hybrid-mode charging circuit according to claim 6, wherein the controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode specifically comprises:

controlling the adapter to output the two times of battery voltage;

controlling the transistor M5 and the transistor M6 to be always in the on state, such that a power inductor is short-circuited; and controlling the transistor M1, the transistor M2, the transistor M3, and the transistor M4 to be turned on or off alternately, wherein an output voltage of a flying capacitor is equal to the battery voltage, such that the charging circuit is in a charge pump control mode.

19. The charging method for a hybrid-mode charging circuit according to claim 7, wherein the controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode specifically comprises:

controlling the adapter to output the two times of battery voltage;

controlling the transistor M5 and the transistor M6 to be always in the on state, such that a power inductor is short-circuited; and controlling the transistor M1, the transistor M2, the transistor M3, and the transistor M4 to be turned on or off alternately, wherein an output voltage of a flying capacitor is equal to the battery voltage, such that the charging circuit is in a charge pump control mode.

20. The charging method for a hybrid-mode charging circuit according to claim 8, wherein the controlling, if the adapter supports continuous voltage regulation, the adapter to output two times of battery voltage, controlling the transistor M5 and the transistor M6 to be always in an on state, and controlling the transistor M1, the transistor M2, the transistor M3, and the transistor M4 to be turned on or off alternately, such that the charging circuit works in a charge pump buck mode specifically comprises:

controlling the adapter to output the two times of battery voltage;

controlling the transistor M5 and the transistor M6 to be always in the on state, such that a power inductor is short-circuited; and controlling the transistor M1, the transistor M2, the transistor M3, and the transistor M4 to be turned on or off alternately, wherein an output voltage of a flying capacitor is equal to the battery voltage, such that the charging circuit is in a charge pump control mode.

* * * * *